United States Patent

[11] 3,532,211

[72] Inventor Jobst Ulrich Gellert,
227 Viewmount Ave.,
Toronto, 19, Ontario, Canada

[21] Appl. No. 794,299
[22] Filed Jan. 27, 1969
[45] Patented Oct. 6, 1970

[54] STORAGE CASE TAPE CARTRIDGE
4 Claims, 7 Drawing Figs.

[52] U.S. Cl. .......... 206/52, 206/1, 220/38
[51] Int. Cl. .......... B65d 85/67, B65d 43/16
[50] Field of Search .......... 206/52, 45.13, 42, (Lifter Digest), 1; 220/38; 211/49, 59

[56] References Cited

UNITED STATES PATENTS

| | | | |
|---|---|---|---|
| 2,329,685 | 9/1943 | Baker .......... | 220/38 |
| 2,492,864 | 12/1949 | Hermani .......... | 206/42 |
| 2,685,970 | 8/1954 | Springer et al. .......... | 211/49 |
| 2,825,466 | 3/1958 | Shnitzler et al. .......... | 211/49 |
| 3,140,777 | 7/1964 | Gordon .......... | 206/45.13 |
| 3,272,325 | 9/1966 | Schoenmakers .......... | 206/52(F)UX |

*Primary Examiner*—William T. Dixson, Jr.
*Attorney*—George H. Riches

ABSTRACT: A protective case for a tape cassette has a cover pivotable to an open position by single handed squeezing action of the user, the opening action serving to eject the tape cassette from the case, being further provided with a display lock to prevent removal of a tape cassette when the case is mounted on a display rod.

INVENTOR
Jobst U. Gellert

By

Attorney

INVENTOR
Jobst U. Gellert
By George [signature]
Attorney

STORAGE CASE TAPE CARTRIDGE

This invention is directed to a case for packing an article such as tape cassettes of the twin reel type.

In the use of record tapes mounted in twin reel cassettes, protective cases are provided to maintain the cassette and the tape in a clean and undamaged condition. Some cassette cases in the prior art also serve a display function, being provided with a through recess adjacent one edge of the case to receive a mounting rod, for pivotal mounting of the cases as a display on such a rod.

Certain known cassette protective cases suffer inherent disadvantages both in the manner of their use, and in their storage function. By the functional arrangement previously provided between the lid and the body portions of such cases it has been necessary to use two hands to extract a cassette from its case, while in respect of rod-mounting cases, these are susceptible to theft of the contents when on display, as the case may be opened and the cassette removed when the case is edge mounted on a display rod.

The present invention provides a protective cassette case which may be opened to expel the cassette by one-handed operation. The invention further provides a cassette case suitable for mounting on a display rod, in accordance with known practice, but having locking shoulder portions of the case engaging the display rod when the case is in a closed condition to preclude opening of the case while mounted on the rod.

Thus there is provided a cassette case to provide slidable edgewise access to a tape cassette for storage within and removal from the case, comprising; a case body portion to receive a cassette in edgewise entry relation; and a case cover pivotally secured to the body portion, having a front edge portion displaceable away from the body portion to provide the required edgewise access, and a rear edge portion displaceable towards the body portion in the opening condition and removable by one-handed squeezing actuation from the closed to the open condition whereby the case may be opened by one-handed operation. Certain embodiments of the present invention are described, reference being had to the accompanying drawings wherein:

Figure 1:
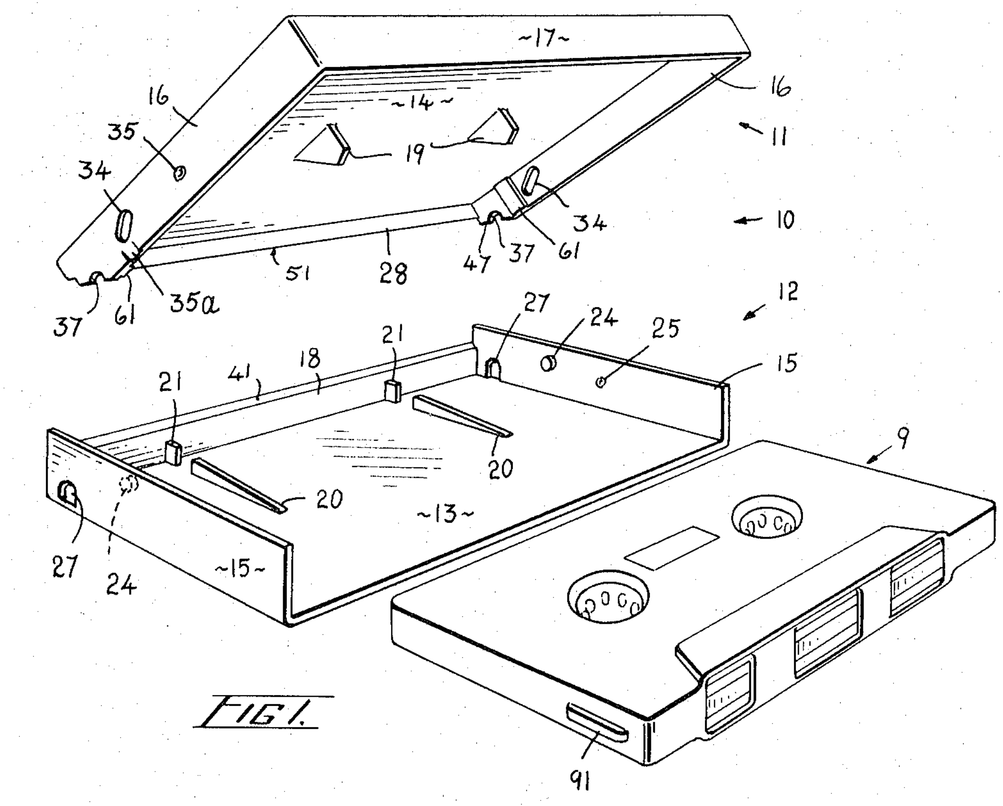
FIG. 1 is an exploded view of the two halves of a cassette case according to the present invention, showing a tape cassette in expelled relation therewith.

Referring to FIG. 1 a cassette 9 of the well-known 2-reel type is provided with a protective case 10 having a cover 11 and a body portion 12. The body portion 12 is in the form of an open tray, having a bottom 13, side walls 15 and a part back wall 18. A pair of ramp members 20 are mounted on the bottom 13, having cassette locating lugs 21 extending from the back wall 18 which may be in aligned relation with the ramp members 20. The locating lugs 21 position the cassette in a forward position to delay the kicking action of the back wall as hereinafter described.

A cover pivot pin 24 extends inwardly from the body side of each wall 15, each wall 15 also containing a detent recess 25, only one being shown. Rod apertures 27 extend in aligned relation through the side walls 15 adjacent the rear wall 18.

Figure 2:
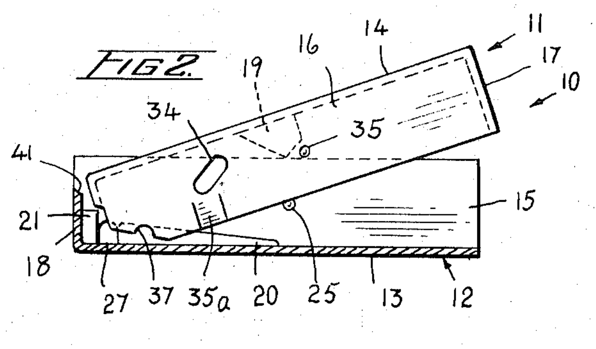
FIG. 2 is an end view of the assembled case in the open condition.
Figure 4:
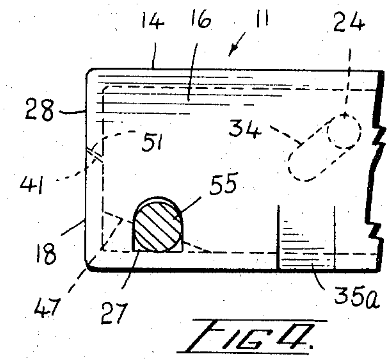
FIG. 4 is similar to FIG. 3, showing the case having a mounting rod inserted in cover locking relation therethrough.
Figure 3:
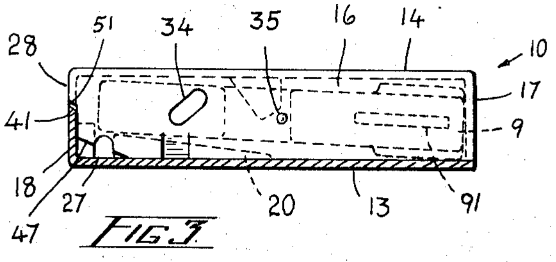
FIG. 3 is an end view similar to FIG. 2 showing the case in the closed condition, having a cassette contained therein.

Referring also to FIGS. 2, 3, and 4, the cover 11 has a top 14, with sides 16, a front edge portion 17 and a part rear wall 28. Reel immobilizing lugs 19 extend inwardly from the top 14. The cover side walls 16 are each provided with a slot 34 and a protuberant detent 35 on the respective outer end surfaces. Shoulder portions 37 terminate the side walls 16, adjacent the back wall 28. The angle of the slot is governed by how wide it is desired and necessary to open the cover for the insertion or removal of the article. The immobilizing lugs 19 are not essential for all articles and may be omitted as occasion dictates. The angle of the slot should preferably be about 45°.

The back wall 18 of the body portion 12 and the back wall 28 of the cover 11 are each provided with respective chamfered cam surfaces 41, 51 which extend forwardly and downwardly.

Referring more particularly to FIGS. 2, 3 and 4 showing the case in the assembled condition, it will be seen that the pivot pins 24 fit into the respective slots 34. The lower edge of each side 16 is chamfered adjacent the respective slot 34 to provide a lead surface 35*a* to the respective pin 24 to facilitate assembly of the case halves 11, 12.

In the condition when the case is closed the detents 35 are in aligned relation with the detent recesses 25, and enter therein tending to secure the case halves in closed relation.

As shown in FIG. 4, the insertion of a suitable bar or rod 55 through the rod apertures 27, with the shoulders 37 of the cover in secured relation therebehind precludes opening of the case or the removal of a cassette therefrom. It will be seen that the ramp member 20 raise the rear edge of the cassette clear of the rod 55 and also into correct position relative to the locating lugs 21 so that when the cover is pressed open as herein described, the back edge of the cover 14 will not come into contact with the adjacent edge of the cassette until just before the cover is wide open. This permits withdrawal of lugs 19 from the cassette and the ejection of the cassette.

Figure 7:
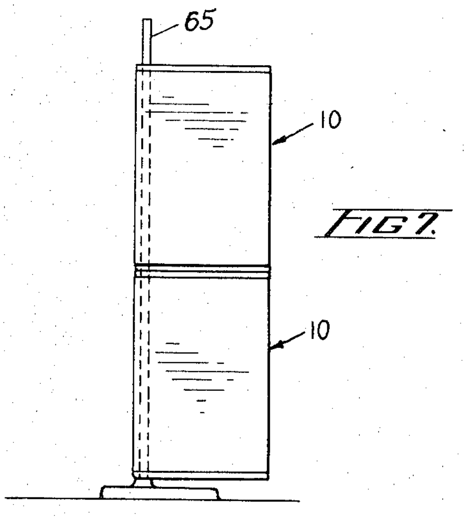
FIG. 7 shows a pair of cases mounted as a typical display array on a vertical display stand.

As illustrated in FIG. 7, a plurality of cases 10 with cassettes therein may be mounted for display purposes on a rod stand 65. Removal of a cassette from one of the cases necessitates the removal of the respective case axially from the stand 65 to free the case from the locking action of the bar.

Figure 5:
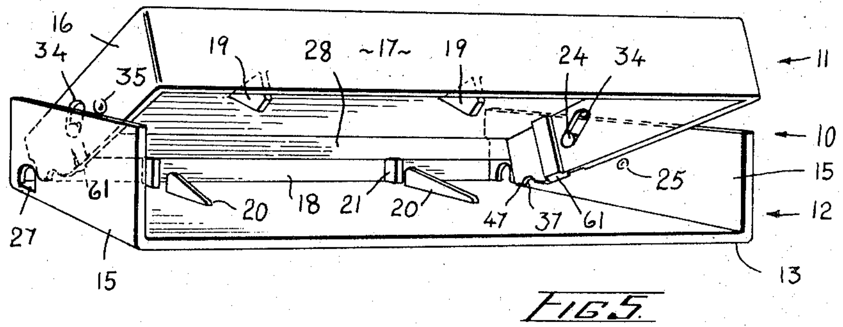
FIG. 5 is a perspective view similar to FIG. 1 showing the cassette case in the assembled and open condition.
Figure 6:
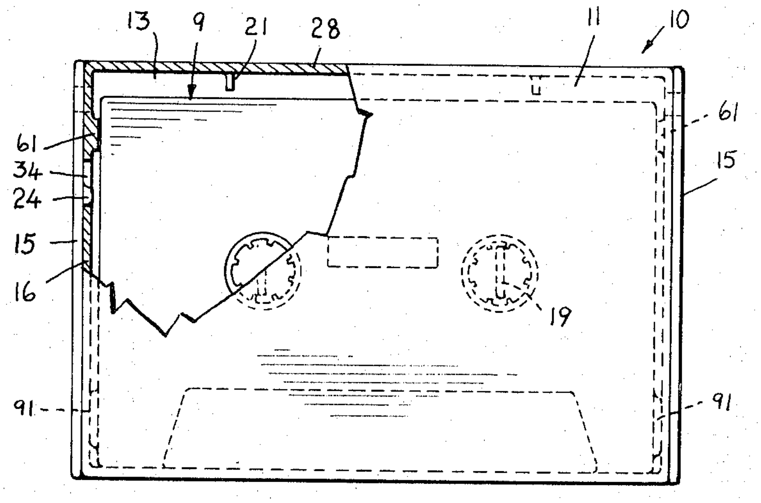
FIG. 6 is a plan view of the case in closed condition having a portion of the cover broken away to show inner details and the relative positioning of a cassette therein.

Referring to FIGS. 4 and 5, when the case is moved from the closed to the open condition by pressing together of the body and cover adjacent the rear edges, the facing inclined cam edge portion 41, 51 produce forward displacement of the cover relative to the body, with upwardly tilting of the cover at an angle of about 25° thus providing clearance for a cassette between the cover edge 17 and the bottom 13, by pivotal movement about the pins 24 moving in the slots 34. The downwardly movement of the cover 11 into the interior of the body 12 is limited by heel portions 47 of the cover side walls 16 which bear against the inner surface of bottom 13. At this limiting open position of the cover 11, the detent protuberances 35 are in abutting relation with the adjacent top edges of the body side walls 15, serving to hold the case in the opened condition for the ready reinsertion of a tape cassette within the case 10. In this open condition the pins 24 bear against the tops of the slots 34.

The precise positioning of a cassette 9 within the case 10 is provided by the ramp members 20 and associated back wall locating lugs 21, together with a pair of spacer bars 61 moulded into the thickness of the case cover walls 16, and located between the respective slot 34 and the lock rod receiving aperture bounded by shoulder 37. The cassette 9 is provided with a pair of front lugs 91 to ensure correct alignment of the cassette relative to the inner surfaces of the case cover side walls.

In use, to dispense a cassette from a closed case, with the case held approximately horizontally and flat in the palm of the hand with the thumb adjacent the rear edge, a moderate squeezing pressure causes the top 11 to flip forwardly and upwardly relative to the bottom 12, while simultaneously the case top 14 kicks the cassette 9 forward to slide freely from the case 10. The forward and upward swinging movement of the top 11 raises the reel locking lugs 19 clear of the cassette 9 before the cassette 9 is propelled forwardly and downwardly over the ramps 20.

The subject case 10 may be made having sufficiently close tolerances to be substantially dust proof.

It will be understood from the foregoing disclosure that the subject case is particularly adapted for ready production and assembly using known moulding techniques with a semi-rigid or rigid plastic such as styrene. The use of clear plastic, as is well known in the art is invisaged, to provide a clear view of the case content, so that cassette labeling may readily be read.

Although the case has been described for use with a tape cassette, it will be apparent that the same will be useful for encasing other articles of commerce consequently the invention is not limited to the specific use described herein.

I claim:

1. A case to provide slidable edgewise entry thereto for storage therein and removal therefrom of a generally flat sided article comprising a base portion having a bottom and two side walls, a cover portion cooperating with said base to form a compartment to receive said article in edgewise entering relation, said cover having a top, front and side walls, the side walls of said base and cover being in adjacent facing and overlapping relation, and said base and cover having rear walls in adjacent abutting relation and being of less height than the side walls, the abutting edges of the rear walls having forward thrust providing chamfered mating surfaces, each adjacent pair of end walls having a pin projecting from one side wall and extending into a slot formed in the adjacent side wall, said slot being inclined upwardly in the opening direction of the cover to provide and guide forward and upward opening motion of the cover relative to the front edge of the base portion when the cover rear edge portion is depressed by squeezing and a reverse movement on closing said cover, ramp means on said base bottom wall and extending toward the rear wall thereof and engageable with the bottom wall of said article, and lug means on one of said rear walls aligning said article on said ramp means, and rear edge portion of said cover being displaceable into said base in the opening condition to strike the rear edge of said article when squeezing pressure is applied to the rear edge of said cover whereby the latter is pivotally actuated relative to the base from the closed to the open position to provide an edgewise opening and the rear edge of the case is moved into the case to strike the rear edge of said article and project it forwardly and downwardly over said ramp means and outwardly of said compartment through the open front of said base portion.

2. The combination of a case to provide slidable edgewise entry thereto for storage therein and removal therefrom of a generally flat sided cassette having reel openings therein comprising: a base portion having a bottom and two side walls, a cover portion cooperating with said base to form a compartment to receive said cassette in edgewise entering relation, said cover having a top, front and side walls, the side walls of said base and cover being in adjacent abutting relation, and said base and cover having rear walls in adjacent abutting relation and being of less height than the side walls, the abutting edges of the rear walls having forward thrust providing chamfered mating surfaces, each adjacent pair of side walls having a pin projecting from one side wall and extending into a slot formed in the adjacent side wall, said slot being inclined upwardly in the opening direction of the cover to provide and guide forward and upward opening motion of the cover relative to the front edge of the base portion when the cover rear edge portion is depressed by squeezing and a reverse movement on closing said cover, ramp means on said base bottom wall and extending toward the rear wall thereof and engageable with the bottom wall of and supporting the rear of said cassette, and depending lug means on the top wall of said cover coacting with said reel openings to lock said reels against rotation when said cover is in closed position, said rear edge portion of said cover being displaceable into said base in the opening condition to strike the rear edge of said cassette when squeezing pressure is applied to the rear edge of said cover whereby the latter is pivotally actuated relative to the base from the closed to the open position to provide an edgewise opening and the rear edge of the case is moved into the case to strike the rear edge of said cassette and project it forwardly and downwardly over said ramp means and outwardly of said compartment through the open front of said base portion.

3. A case as claimed in claim 2 wherein said depending lug means are spaced and are formed with downwardly and forwardly tapered rear portions to facilitate removal of said lugs from said cassette reel openings and forward ejecting movement of said cassette over said ramp means when squeezing pressure is applied to the rear edge of said cover.

4. A case as claimed in claim 2 wherein said ramp means are spaced and slope upwardly and rearwardly of the base bottom wall and terminate adjacent the rear wall thereof.